US011265517B2

(12) United States Patent
Sakurada et al.

(10) Patent No.: US 11,265,517 B2
(45) Date of Patent: Mar. 1, 2022

(54) IMAGE INFORMATION COLLECTION SYSTEM AND VEHICLE

(71) Applicant: TOYOTA JIDOSHA KABUSHIKI KAISHA, Toyota (JP)

(72) Inventors: Shin Sakurada, Toyota (JP); Sinae Kim, Nagoya (JP); Takayuki Yano, Nisshin (JP); Naoki Yamamuro, Nagoya (JP); Takashi Hayashi, Aichi-gun (JP); Koji Miyata, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/814,441

(22) Filed: Mar. 10, 2020

(65) Prior Publication Data
US 2020/0314389 A1 Oct. 1, 2020

(30) Foreign Application Priority Data

Mar. 29, 2019 (JP) .............................. JP2019-066906

(51) Int. Cl.
H04N 7/18 (2006.01)
G06K 9/00 (2022.01)
(52) U.S. Cl.
CPC .......... *H04N 7/185* (2013.01); *G06K 9/00791* (2013.01); *G06K 9/00758* (2013.01); *G06K 9/00993* (2013.01)
(58) Field of Classification Search
CPC ............... H04N 7/185; G06K 9/00791; G06K 9/00664; G08G 1/0968; G08G 1/01; G08G 1/04
See application file for complete search history.

(56) References Cited

U.S. PATENT DOCUMENTS

| 10,659,144 | B1* | 5/2020 | Tofighbakhsh | H04L 67/12 |
| 10,791,037 | B2* | 9/2020 | Greenberg | H04L 41/5019 |
| 2015/0220789 | A1* | 8/2015 | Wood | G06T 7/246 |
| | | | | 382/103 |
| 2015/0248795 | A1* | 9/2015 | Davidson | G01C 21/34 |
| | | | | 701/1 |
| 2017/0374323 | A1* | 12/2017 | Gornik | G06T 7/0004 |
| 2018/0038709 | A1 | 2/2018 | Takahashi | |
| 2018/0167579 | A1* | 6/2018 | Breedvelt-Schouten | |
| | | | | G06T 7/00 |
| 2020/0027196 | A1* | 1/2020 | Wolfson | G06T 3/4053 |

FOREIGN PATENT DOCUMENTS

| JP | 2008-027097 A | 2/2008 |
| JP | 2013-152587 A | 8/2013 |

\* cited by examiner

*Primary Examiner* — Richard T Torrente
(74) *Attorney, Agent, or Firm* — Oliff PLC

(57) ABSTRACT

An image information collection system is an image information collection system in which a server device collects image information from a vehicle via a telecommunications line. The vehicle includes: an imaging device configured to capture a surrounding image; and a control device configured to calculate an evaluation value of the surrounding image captured by the imaging device, the control device being configured to determine, based on the evaluation value thus calculated and a location where the surrounding image is captured, whether or not the surrounding image is transmitted to the server device as the image information, the control device being configured to transmit, to the server device, the surrounding image determined to be transmitted.

3 Claims, 3 Drawing Sheets

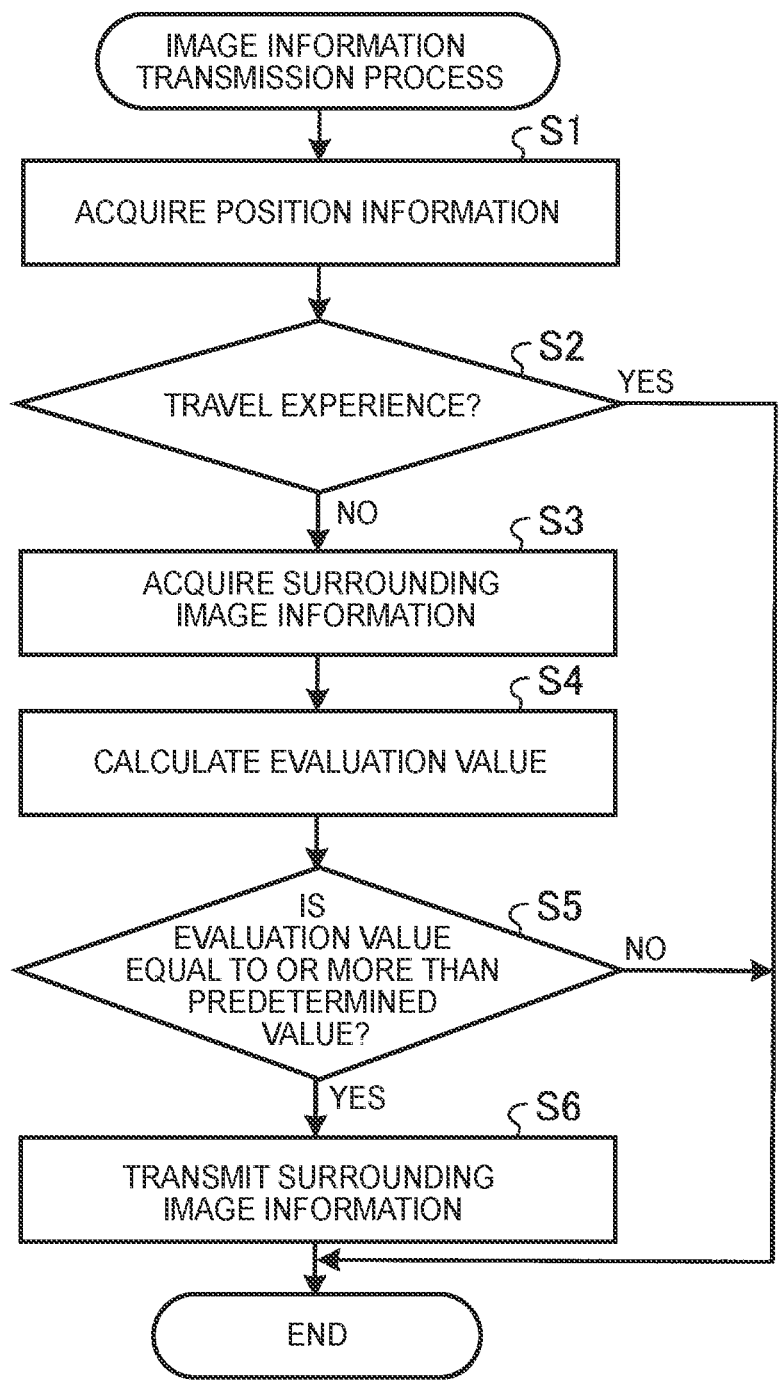

IMAGE INFORMATION COLLECTION SYSTEM AND VEHICLE

INCORPORATION BY REFERENCE

The disclosure of Japanese Patent Application No. 2019-066906 filed on Mar. 29, 2019 including the specification, drawings and abstract is incorporated herein by reference in its entirety.

BACKGROUND

1. Technical Field

The present disclosure relates to an image information collection system in which a server device collects image information from a vehicle via a telecommunications line, and a vehicle.

2. Description of Related Art

Japanese Unexamined Patent Application Publication No. 2008-27097 (JP 2008-27097 A) describes a system in which an in-vehicle navigation device takes in a captured image from a camera at each image transmission timing in accordance with set frequency and immediately transmits data of the captured image thus taken in to a records center.

SUMMARY

In the system described in JP 2008-27097 A, pieces of data of all captured images from all vehicles are transmitted to the records center, so that heavy communication traffic between the vehicles and the records center might be caused.

The present disclosure is accomplished in view of the above problem, and an object of the present disclosure is to provide an image information collection system that enables collection of image information from a vehicle without causing heavy communication traffic and is also to provide a vehicle.

An image information collection system according to the present disclosure is an image information collection system in which a server device collects image information from a vehicle via a telecommunications line. The vehicle includes an imaging device and a control device. The imaging device is configured to capture a surrounding image. The control device is configured to calculate an evaluation value of the surrounding image captured by the imaging device. The control device is configured to determine, based on the evaluation value thus calculated and a location where the surrounding image is captured, whether or not the surrounding image is transmitted to the server device as the image information. The control device is configured to transmit, to the server device, the surrounding image determined to be transmitted.

Note that the control device may calculate the evaluation value based on image quality of the surrounding image. This accordingly makes it possible to restrain image information having a low image quality and a low utility value from being transmitted to the server device.

Further, the control device may not transmit, to the server device, a surrounding image captured in a location where the vehicle has traveled before. This accordingly makes it possible to restrain image information that has been already collected from being transmitted to the server device again.

A vehicle according to the present disclosure includes an imaging device and a control device. The imaging device is configured to capture a surrounding image. The control device is configured to calculate an evaluation value of the surrounding image captured by the imaging device. The control device is configured to determine, based on the evaluation value thus calculated and a location where the surrounding image is captured, whether or not the surrounding image is transmitted to the server device. The control device is configured to transmit, to the server device, the surrounding image determined to be transmitted.

In the image information collection system and the vehicle according to the present disclosure, as it is determined whether or not a surrounding image is transmitted to the server device, based on an evaluation value of the surrounding image and a location where the surrounding image is captured, only selected image information is transmitted to the server device from the vehicle. Accordingly, it is possible to collect image information from the vehicle without causing heavy communication traffic.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 3 is a flowchart illustrating the procedure of an image information transmission process according to one embodiment of the present disclosure.

DETAILED DESCRIPTION OF EMBODIMENTS

With reference to drawings, the following describes a configuration of an image information collection system according to one embodiment of the present disclosure.

Overall Configuration

Figure 1:
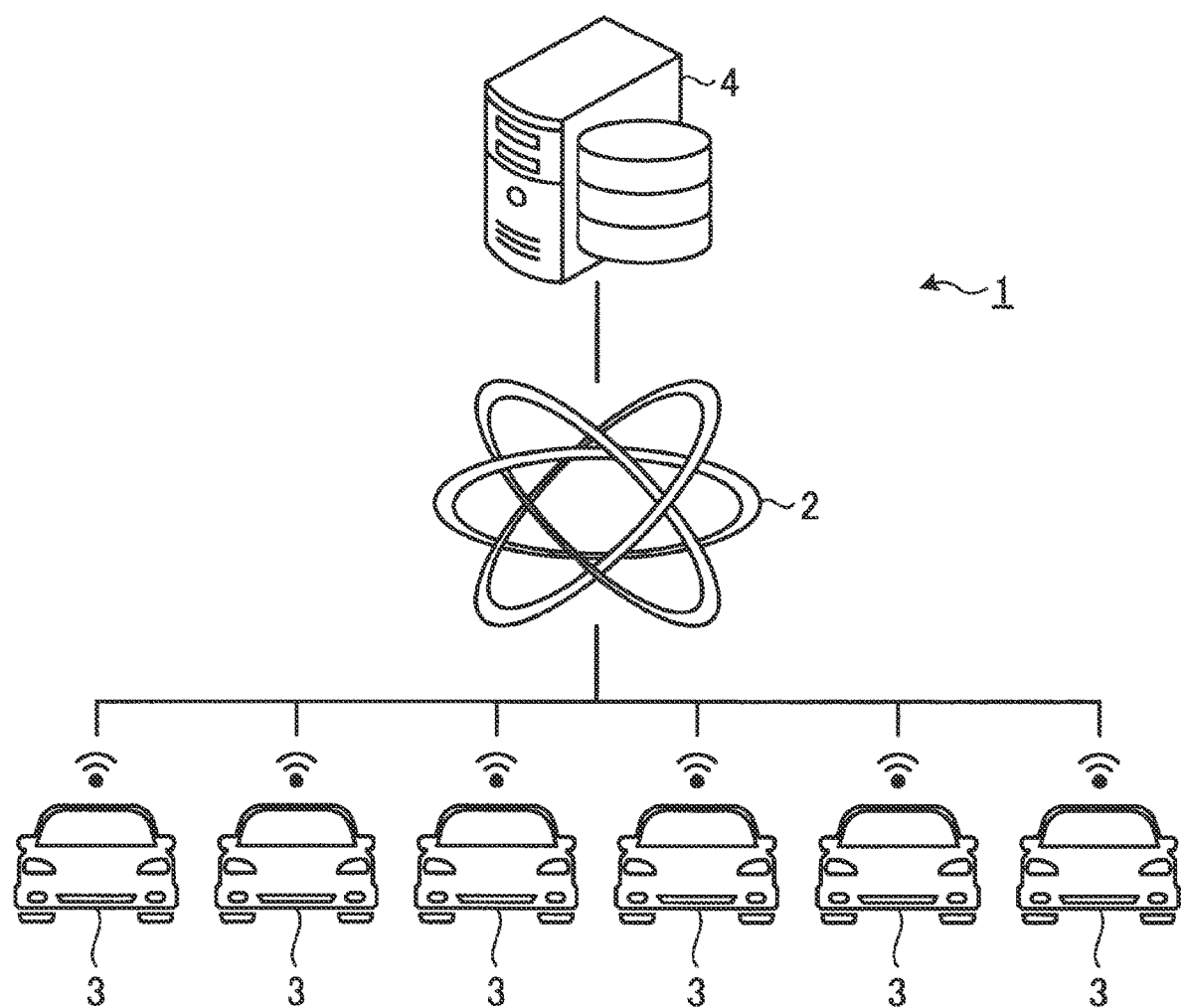
FIG. 1 is a schematic view illustrating a configuration of an image information collection system according to one embodiment of the present disclosure.

First described is an overall configuration of the image information collection system according to one embodiment of the present disclosure with reference to FIG. 1.

FIG. 1 is a schematic view illustrating the configuration of the image information collection system according to one embodiment of the present disclosure. As illustrated in FIG. 1, an image information collection system 1 according to one embodiment of the present disclosure is a system in which a server device 4 collects image information from a vehicle 3 via a telecommunications line 2 such as an Internet network or a mobile phone network. The image information collection system 1 includes a plurality of vehicles 3 and the server device 4 as main constituents.

Configuration of Vehicle

Figure 2:
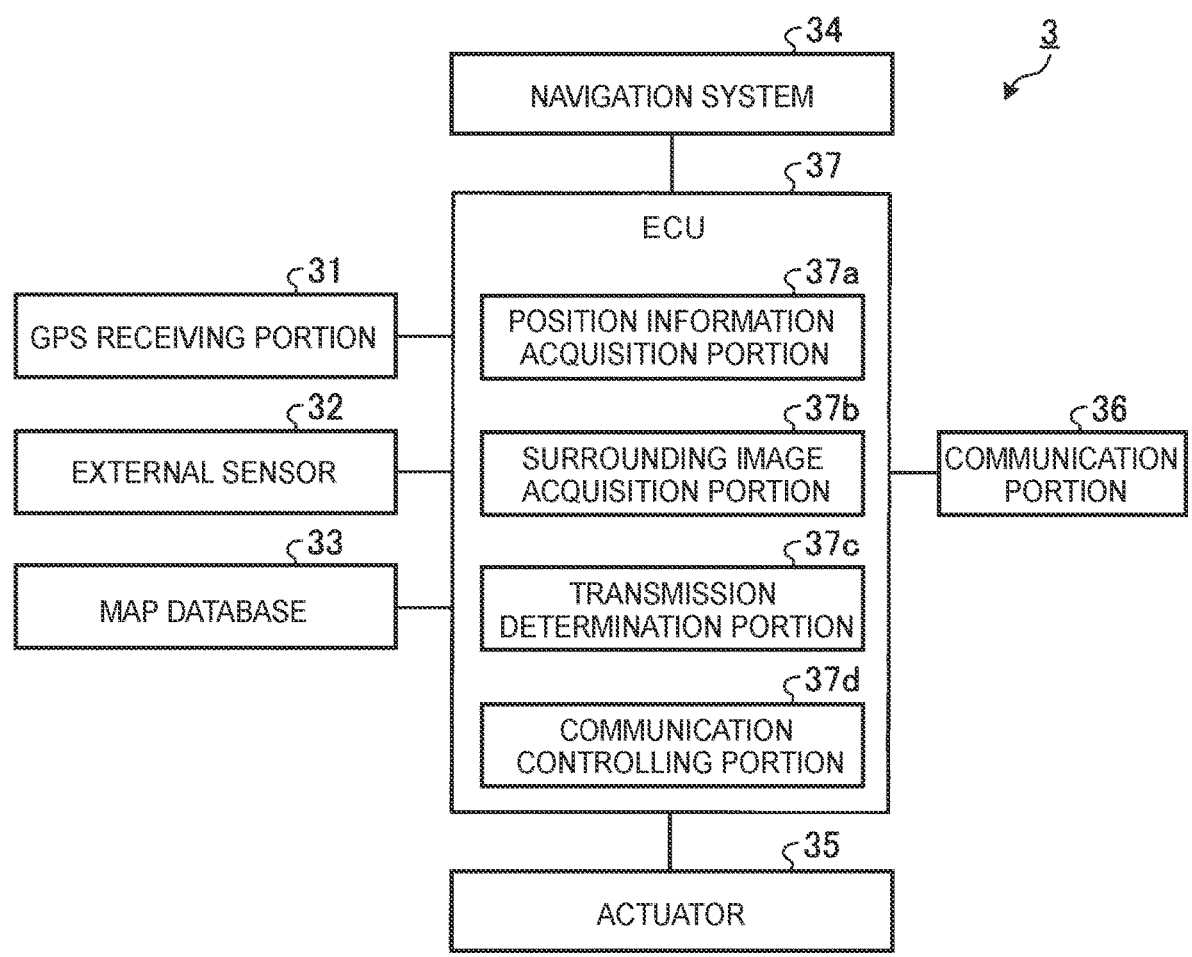
FIG. 2 is a block diagram illustrating a configuration of a vehicle illustrated in FIG. 1.

With reference to FIG. 2, the following describes a configuration of the vehicle 3.

FIG. 2 is a block diagram illustrating the configuration of the vehicle 3 illustrated in FIG. 1. As illustrated in FIG. 2, the vehicle 3 includes a global positioning system (GPS) receiving portion 31, an external sensor 32, a map database 33, a navigation system 34, an actuator 35, a communication portion 36, and an electronic control unit (ECU) 37.

The GPS receiving portion 31 functions as a position measuring portion configured to measure a position of the vehicle 3. The GPS receiving portion 31 measures the position of the vehicle 3 (e.g., latitude and longitude of the vehicle 3) by receiving signals from three or more GPS satellites. The GPS receiving portion 31 outputs information on the measured position of the vehicle 3 to the ECU 37. Note that the vehicle 3 may measure the position of the vehicle 3 by a simultaneous localization and mapping (SLAM) technology by use of position information on fixed obstacles such as power poles and a detection result from the external sensor 32. The position information on fixed obstacles is included in map information stored in the map database 33.

The external sensor 32 includes imaging devices, a radar, and a LIDAR. The imaging devices are imaging equipment configured to capture an image of a state outside the vehicle 3. The imaging devices are provided on a back side of a windshield of the vehicle 3 and a back face of the vehicle 3. The imaging devices may be provided on right and left side faces of the vehicle 3. The imaging devices output pieces of imaging information on captured images in front of and behind the vehicle 3 to the ECU 37. The imaging device may be a monocular camera or may be a stereoscopic camera. The stereoscopic camera has two imaging portions placed to reproduce binocular parallax. Imaging information of the stereoscopic camera also includes information in a depth direction.

The radar detects an obstacle around the vehicle 3 by use of a radio wave (e.g., millimeter wave). The radar transmits a radio wave to a region around the vehicle 3 and detects an obstacle by receiving a radio wave reflected from the obstacle. The radar outputs obstacle information thus detected to the ECU 37. The obstacle includes a dynamic obstacle such as a bicycle or other vehicles, other than the fixed obstacles. The LIDAR detects an obstacle around the vehicle 3 by use of light. The LIDAR transmits light to a region around the vehicle 3 and measures a distance to a reflection point by receiving light reflected from an obstacle, and thus, the LIDAR detects the obstacle. The LIDAR outputs obstacle information thus detected to the ECU 37. It is not always necessary for the external sensor 32 to include both the LIDAR and the radar.

The map database 33 is a database in which map information is stored. The map database 33 is formed in a storage device such as a hard disk drive (HDD) provided in the vehicle 3. The map database 33 can be connected to the server device 4 by wireless communication via the communication portion 36. The map database 33 regularly updates the map information by use of latest map information stored in the server device 4. The map information includes position information on roads (position information of each lane), information on road shapes (e.g., types such as a curve and a linear part, a curvature of a curve, and so on), information on road widths (information on lane widths), information on limited speeds on roads, image information around roads (three-dimensional information), and information (travel experience information) on roads where the vehicle 3 has traveled before. Further, the map information includes position information on intersections and branch points, position information on temporary stop lines, position information on zebra zones, and position information on traffic lights. The map information may include information on road gradients and information on road cant. Further, the map information may include position information and shape information on fixed obstacles such as curb stones, power poles, poles, guard rails, walls, and buildings. The map information may include position information and shape information on road surface paint such as characters and marks drawn on road surfaces. The road surface paint may include manholes. The map information may include information on signboards provided above roads, and information on signs provided on roadsides.

Based on a destination set in advance, the position of the vehicle 3 that is measured by the GPS receiving portion 31, and the map information in the map database 33, the navigation system 34 calculates a target route from a current position of the vehicle 3 to the destination by a well-known technique and executes route guidance along the target route. The destination is set such that an occupant of the vehicle 3 operates an input button (or a touch panel) provided in the navigation system 34.

The actuator 35 is a device configured to perform a travel control on the vehicle 3. The actuator 35 includes a throttle actuator, a brake actuator, and a steering actuator. The throttle actuator controls a supply amount (a throttle opening degree) of air to an engine in accordance with a control signal from the ECU 37 and controls driving force of the vehicle 3. Note that, in a case where the vehicle 3 is a hybrid vehicle, the driving force is controlled such that a control signal from the ECU 37 is input into a motor as a power source, in addition to the control on the supply amount of the air to the engine. In a case where the vehicle 3 is an electric vehicle, the driving force is controlled such that a control signal from the ECU 37 is input into a motor as a power source. The motors as the power sources in those cases constitute the actuator 35. The brake actuator controls a brake system in accordance with a control signal from the ECU 37 and controls braking force applied to wheels of the vehicle 3. The steering actuator controls driving of an assist motor in accordance with a control signal from the ECU 37. The assist motor is configured to control a steering torque in an electric power steering system.

The communication portion 36 is constituted by a radio communications circuit and so on for wireless communication and performs information communication with the server device 4 via the telecommunications line 2. The communication portion 36 may perform vehicle-to-vehicle communication with other vehicles that can perform vehicle-to-vehicle communication. Further, the communication portion 36 may perform road-to-vehicle communication with a roadside transmitter-receiver provided along a road.

The ECU 37 is an electronic control unit including a central processing unit (CPU), a read only memory (ROM), a random access memory (RAM), a controller area network (CAN) communication circuit, and so on. In the present embodiment, the ECU 37 loads a computer program stored in the ROM to the RAM and executes the computer program loaded in the RAM by the CPU. Hereby, the ECU 37 functions as a position information acquisition portion 37a, a surrounding image acquisition portion 37b, a transmission determination portion 37c, and a communication controlling portion 37d.

The position information acquisition portion 37a acquires information on the position of the vehicle 3 by use of the GPS receiving portion 31. The surrounding image acquisition portion 37b acquires surrounding image information around the vehicle 3 by use of the external sensor 32. The transmission determination portion 37c executes an image information transmission process (described later) and transmits image information to the server device 4 via the telecommunications line 2. The communication controlling portion 37d controls information communication with the server device 4 via the telecommunications line 2.

The image information collection system 1 having such a configuration executes the image information transmission process as described below so as to collect image information from the vehicle 3 without causing heavy communication traffic. The following describes an operation of the image information collection system 1 at the time when the image information collection system 1 executes the image information transmission process, with reference to a flowchart illustrated in FIG. 3.

Image Information Transmission Process

FIG. 3 is a flowchart illustrating the procedure of the image information transmission process according to one embodiment of the present disclosure. The flowchart illustrated in FIG. 3 is started at a timing when an ignition switch of the vehicle 3 is changed from an OFF state to an ON state. Here, the image information transmission process proceeds to a process of step S1. While the ignition switch of the vehicle 3 is in the ON state, the image information transmission process is executed repeatedly every time when a predetermined time elapses from the end of a previous image information transmission process.

In the process of step S1, the position information acquisition portion 37a acquires position information of the vehicle 3 by use of the GPS receiving portion 31. Hereby, the process of step S1 is completed, and the image information transmission process proceeds to a process of step S2.

In the process of step S2, based on the position information of the vehicle 3 that is acquired in the process of step S1 and the travel experience information stored in the map database 33, the transmission determination portion 37c determines whether or not the vehicle 3 has a travel experience of traveling the current position before. As a result of the determination, when the vehicle 3 has the travel experience (step S2: Yes), the transmission determination portion 37c ends a series of processes as the image information transmission process. In the meantime, when the vehicle 3 does not have the travel experience (step S2: No), the transmission determination portion 37c advances the image information transmission process to a process of step S3.

In the process of step S3, the surrounding image acquisition portion 37b acquires surrounding image information around the vehicle 3 by use of the external sensor 32. Hereby, the process of step S3 is completed, and the image information transmission process proceeds to a process of step S4.

In the process of step S4, the transmission determination portion 37c calculates an evaluation value of the surrounding image information acquired in the process of step S3. More specifically, the transmission determination portion 37c calculates the evaluation value of the surrounding image information by use of parameters about image quality such as luminance, contrast, color temperature, color reproduction range, and distortion and information on a time range during which the surrounding image information is captured and so on. For example, in a case where the time range during which the surrounding image information is acquired is a morning time or a night time, the image quality of a surrounding image may not be high due to backlight or an insufficient light amount. Accordingly, the transmission determination portion 37c calculates the evaluation value to be lower than an evaluation value of surrounding image information acquired in other time ranges. Hereby, the process of step S4 is completed, and the image information transmission process proceeds to a process of step S5.

In the process of step S5, the transmission determination portion 37c determines whether or not the evaluation value calculated in the process of step S4 is equal to or more than a predetermined value. As a result of the determination, when the evaluation value is equal to or more than the predetermined value (step S5: Yes), the transmission determination portion 37c advances the image information transmission process to a process of step S6. In the meantime, when the evaluation value is less than the predetermined value (step S5: No), the transmission determination portion 37c determines that the acquired surrounding image information is useless or meaningless image information and ends the series of processes as the image information transmission process.

In the process of step S6, the communication controlling portion 37d transmits, to the server device 4 via the telecommunications line 2, the surrounding image information acquired in the process of step S3 together with the position information acquired in the process of step S1. After that, the server device 4 stores, in a database, the surrounding image information and the position information thus transmitted from the vehicle 3 in association with each other. Hereby, the process of step S6 is completed, and the series of processes as the image information transmission process is ended.

As is apparent from the above description, in the image information collection system 1 according to one embodiment of the present disclosure, the vehicle 3 calculates an evaluation value of a surrounding image and determines whether or not the vehicle 3 transmits the surrounding image as image information to the server device 4, based on the evaluation value thus calculated and a location where the surrounding image is captured. Then, the vehicle 3 transmits, to the server device 4, the surrounding image determined to be transmitted. In such a configuration, as it is determined whether or not the surrounding image is transmitted to the server device 4, based on the evaluation value of the surrounding image and the location where the surrounding image is captured, only selected image information is transmitted to the server device 4 from the vehicle 3. Accordingly, it is possible to collect image information from the vehicle 3 without causing heavy communication traffic.

Further, in the image information collection system 1 according to one embodiment of the present disclosure, the vehicle 3 calculates the evaluation value based on the image quality of the surrounding image. This accordingly makes it possible to restrain image information having a low image quality and a low utility value from being transmitted to the server device 4. Further, since the vehicle 3 does not transmit, to the server device 4, a surrounding image captured in a location where the vehicle 3 has traveled before, it is possible to restrain image information that has been already collected from being transmitted to the server device 4 again.

The embodiment to which the disclosure accomplished by the inventors is applied has been described above, but the present disclosure is not limited by descriptions and drawings as part of the disclosure of the disclosure in the present embodiment. That is, other embodiments, examples, application techniques, and so on made by a person skilled in the art and others based on the present embodiment are all included in the present disclosure.

What is claimed is:

1. An image information collection system in which a server device collects image information from a vehicle via a telecommunications line, wherein the vehicle includes:
   an imaging device configured to capture a surrounding image; and
   a control device configured to calculate an evaluation value of the surrounding image captured by the imaging device, the control device being configured to determine, based on the evaluation value thus calculated and a location where the surrounding image is captured, whether or not the surrounding image is transmitted to the server device as the image information, the control device being configured to transmit, to the server device, the surrounding image determined to be transmitted, wherein the evaluation value is calculated based on a parameter about image quality of the surrounding image and information on a time range during which the surrounding image is captured, and the evaluation value of the surrounding image captured during a time range in which the image quality of the surrounding image may not be high due to backlight is calculated to be lower than the evaluation values of the surrounding images captured during other time ranges.

2. The image information collection system according to claim 1, wherein the control device does not transmit, to the server device, a surrounding image captured in a location where the vehicle has traveled before.

3. A vehicle comprising:
an imaging device configured to capture a surrounding image; and a control device configured to calculate an evaluation value of the surrounding image captured by the imaging device, the control device being configured to determine, based on the evaluation value thus calculated and a location where the surrounding image is captured, whether or not the surrounding image is transmitted to the server device, the control device being configured to transmit, to the server device, the surrounding image determined to be transmitted, wherein the evaluation value is calculated based on a parameter about image quality of the surrounding image and information on a time range during which the surrounding image is captured, and the evaluation value of the surrounding image captured during a time range in which the image quality of the surrounding image may not be high due to backlight is calculated to be lower than the evaluation values of the surrounding images captured during other time ranges.

* * * * *